Patented Mar. 17, 1953

2,631,997

UNITED STATES PATENT OFFICE 2,631,997

POLYMERIZATION OF UNSATURATED ORGANIC COMPOUNDS USING IMPROVED REDOX CATALYSTS

William D. Stewart, Brecksville, Ohio, assignor to The B. F. Goodrich Company, New York, N. Y., a corporation of New York No Drawing. Application July 14, 1950, Serial No. 173,938

9 Claims. (Cl. 260—82.7)

The present invention relates generally to the polymerization of unsaturated organic compounds which, by reason of containing the vinylidene $CH_2=C<$ structure, are capable of undergoing addition polymerization to form molecular weight predominantly linear polymers, and pertains particularly to the polymerization, in aqueous emulsion in the presence of improved redox catalysts, of conjugated dienes and mixtures thereof with vinyl and other vinylidene compounds such as styrene, acrylonitrile, alkyl acrylates, vinylidene chloride and the like.

It is well known that the addition polymerization of various polymerizable vinylidene compounds, particularly the butadiene-1,3 hydrocarbons, may be accelerated or promoted by the presence of oxygen-yielding substances and that the combination of an oxidant with a reductant to form a redox system with or without an activating heavy metal salt, produces very rapid polymerization rates. The use of such redox systems has been found particularly useful in the production of the so-called "cold rubber" that is, in the production of rubbery butadiene-1,3 styrene copolymers at temperatures of —10 to 30° C.

There are various difficulties, however, encountered in the use of the known redox systems. One difficulty stems from the necessity for very careful and meticulous catalyst preparation. Most of the catalysts must be freshly prepared shortly before use in order to obtain fast reaction rates. One of the best known catalysts, namely a catalyst consisting of a combination of a sugar, an oxidant and an iron salt, must be heat-aged before use to develop its maximum catalytic effect and after aging is stable for less than one week. Slight variations in the technique of preparation of most of the redox catalysts, often unavoidable in production procedures, are apt to produce very slow reactions. In addition, difficulty is encountered in synthetic rubber processing plants when a catalyst is utilized which contains an organic material such as a sugar, because the sugar residues remain in the rubber dispersion, in the rubber itself or in the processing equipment and serves as a metabolite for a host of microorganisms with consequent fermentation and mold formation on the equipment and in the latex during storage. Moreover, while the known redox catalysts, particularly the oxidant-sugar-iron combination, have made possible polymerization at low temperatures, the rates of polymerization have not been entirely satisfactory, as much as 30 hours at 10° C. being required for reaction to 60 or 70% conversion.

I have discovered that vinylidene compounds in general, and preferably monomeric mixtures of butadiene-1,3 hydrocarbons with monoolefinic monomers such as styrene, acrylonitrile, alkyl esters of acrylic acids such as methyl acrylate and methyl methacrylate, vinylidene chloride, and others, may be polymerized very rapidly and efficiently at low temperatures (below 30° C.), to yield polymers having excellent properties if the polymerization is carried out in an aqueous medium in the presence of small amounts of a redox catalyst comprising an alkylene polyamine of a particular structure, a compound ionizable to yield sulfite ($SO_3^=$) ion, and an oxidant. The latter combination causes polymerization to proceed at temperatures of 30° C. or lower at a faster and more uniform rate than known redox catalysts.

The amine and sulfite constituents of my new catalyst combination may be prepared as an amino-sulfite reaction product such as is prepared by reaction in solution between an amine of the class disclosed below and sulfur dioxide and added as such to the polymerization medium or the amine and a water-soluble sulfite salt may be separately dissolved in water and without aging added directly to the reaction medium. Since it is generally advantageous, as will be described also hereinbelow, to conduct the polymerization in an alkaline medium and the amine-sulfur dioxide reaction product is unstable in alkaline solution, the separate addition of amine and a water-soluble substance ionizable to yield sulfite ion is generally the preferred procedure.

The new catalyst combination of this invention is applicable generally to the polymerization of unsaturated organic compounds which contain the $CH_2=C<$ group, that is, vinylidene compounds and compounds containing a terminal methylene group attached by a double bond to a carbon atom which undergo addition polymerization to produce predominantly linear polymers. Examples of such compounds include the conjugated, open-chain dienes such as the butadiene-1,3 hydrocarbons including butadiene-1,3, isoprene, 2,3-dimethyl butadiene-1,3, and others, chloroprene, 3-cyano butadiene-1,3, piperylene and others, trienes such as myrcene; mixtures of the conjugated dienes with vinyl and vinylidene compounds such as vinylidene chloride, styrene, p-chlorostyrene, 3,5-dichlorostyrene, p-methoxy styrene, acrylic and alpha-alkyl acrylic acids, their esters, nitriles and amides such as acrylic acid, methacrylic acid, methyl acrylate, octyl acrylate, methyl methacrylate, lauryl methacrylate, acrylinitrile, alpha-chloro acrylonitrile, methacrylonitrile, dimethyl acrylamide and others, vinyl pyridine, vinyl benzoate, vinyl ketones and vinyl ethers, vinyl carbazole, and others, and compounds copolymerizable with the dienes such as isobutylene, diallyl maleate, 1,4-divinyl benzene and others; compounds containing both olefinic and acetylenic bonds such as vinyl acetylene, vinyl ethynyl carbinol, and the like, and others; and vinylidene compounds containing only one carbon to carbon double bond such as the vinyl compounds including vinyl chloride, vinylidene chloride, styrene, p-chlorostyrene, 3,5-dichlorostyrene, p-methoxy styrene, acrylonitrile, methacrylonitrile, alpha-chloro acrylonitrile, methyl acrylate, ethyl acrylate, methyl methacrylate, butyl ethacrylate, dimethyl acrylamide, vinyl methyl ketone, vinyl methyl ether, vinyl pyridine, vinyl acetate, vinyl propionate, vinyl benzoate, and others, and isobutylene, ethylene, and other monoolefinic polymerizable compounds. The above vinylidene compounds may be copolymerized with one another or with still other unsaturated polymerizable materials such as diethyl maleate, diethyl fumarate, maleic acid or anhydride and others.

It will be understood from the above examples that vinyl compounds are a sub-genus of vinylidene compounds since they contain the characteristic $CH_2=C<$ structure, one of the free valences being connected to hydrogen to form the vinyl

group.

The class of alkylene polyamines useful in this invention are those polyamines in which there are at least two amino groups separated by at least two carbon atoms and containing at least one terminal primary amino group. Thus, the methylene polyamines are inactive whereas the ethylene polyamines and the alpha-methylethylene polyamines and other similar alkylene polyamines are very active. The simplest active compound of this class is ethylene diamine. Other amines of this class include diethylene triamine, triethylene tetramine, tetraethylene pentamine, pentaethylene hexamine, hexaethylene heptamine, propylene diamine, dipropylene triamine, tetrapropylene pentamine, butylene diamine, dibutylene triamine, tetrabutylene pentamine, pentylene diamine, tripentylene tetramine, tetrapentylene pentamine and others.

The compounds within the above general class which yield superior results have the general structure

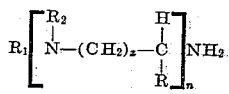

wherein $n$ is a number from 1 to 15, $x$ is a number from 1 to 4, and R, $R_1$ and $R_2$ are selected from the class consisting of hydrogen and hydrocarbon groups. Included within this class are ethylene diamine, diethylene triamine, tetraethylene pentamine, pentaethylene hexamine, hexaethylene heptamine and the like, alpha-methylethylene diamine, bis-(alpha-methylethylene) triamine, tris-(alpha-methylethylene) tetramine, tetra-(alpha-methylethylene) pentamine, N-methyl-alpha-methylethylene diamine, N-propyl-alpha-ethylethylene diamine, N-phenyl-alpha-methylethylene diamine, N-cyclohexyl ethylene diamine, and others.

Best results are obtained from the use of the polyethylene polyamines containing more than one ethylene group and at least one primary amino group including diethylene triamine, triethylene tetramine, tetraethylene pentamine, pentaethylene hexamine, hexaethylene heptamine, bis-(alpha-methylethylene) triamine, tris-(alpha-methylethylene) tetramine, tetra-(alpha-methylethylene) pentamine and others containing from 2 to 15 ethylene groups and a plurality of amino groups, one of which is a terminal primary amino group.

The sulfite ion in the catalyst combination of this invention may be obtained by addition of sulfur dioxide to the reaction medium or from any substance ionizable in water to yield sulfite ($SO_3^=$) ion such as potassium, sodium and ammonium sulfites, bisulfites and the like. Since potassium ion is the effective metallic cation in reducing latex viscosity the potassium sulfites and bisulfites are greatly preferred.

The polyamine and sulfite compounds may be utilized in combination with any oxygen-yielding substance or peroxygen compound including hydrogen peroxide, sodium, potassium and ammonium persulfate, benzoyl peroxide, cumene hydroperoxide, alkali-metal perborates, percarbonates and perphosphates and others. The amine —$SO_3$ combination produces the shortest reaction cycle when combined with an oil-soluble aryl monohydroperoxide such as isopropyl benzene monohydroperoxide (cumene hydroperoxide), diisopropylbenzene monohydroperoxide, triisopropylbenzene monohydroperoxide, tert-butyl isopropylbenzene monohydroperoxide, di-tert-butylbenzene monohydroperoxide, beta-isopropyl naphthalene monohydroperoxide, cyclohexylbenzene monohydroperoxide and others. This class of aryl monohydroperoxides have been found to produce when combined with the amine —$SO_3$ complex much faster reaction rates than ordinary di-peroxides such as lauroyl peroxide, benzoyl peroxides, p-chloro and 2,4-dichloro benzoyl peroxides and the like and of this class diisopropyl benzene monohydroperoxide, triisopropylbenzene monohydroperoxide, cyclohexylbenzene monohydroperoxide, and tert-butyl isopropylbenzene monohydroperoxide have been found to be the most efficient in this respect.

In the practice of this invention monomeric compounds or mixtures of monomers are polymerized by well known methods of polymerization as by polymerization in aqueous emulsion in the presence of catalytic amounts of the redox catalyst system of this invention. As is well known the oxidant and reductant portions of the redox system are not premixed but the water, soap, amine, sulfite and other electrolyte salts, and one or more of the monomeric materials are first added, the reaction vessel closed and evacuated (or blanketed with nitrogen) and then the oxidant is added last of all, preferably as a solution in an aliquot portion of a relatively non-volatile monomer or in an inert solvent. In any event it is best that the water-soluble ingredients be added to the aqueous phase and the oil-soluble oxidant be incorporated in the monomer or oil phase. After all ingredients are added, the reaction mixture is agitated and its temperature controlled by supplying a coolant or heating medium until the stable aqueous dispersion of polymer is obtained.

The reaction carried out according to this invention may be carried to substantial completion, if desired, but at present it appears that the synthetic rubbery polymers in particular are best made in a medium low in polymerization modifier and the reaction terminated at from 50 to 70% conversion by the addition of hydroquinone, dinitrochlorobenzene or other polymerization inhibitor in order to obtain polymers of maximum plasticity and strength. Polymerization modifiers such as the various sulfur-containing organic compounds, including the primary, secondary and tertiary aliphatic mercaptans containing from 4 to 16 carbon atoms, are preferably utilized in small amounts ranging from 0.1 to 5.0% based on the monomers in order to obtain plastic polymers. The latter substances, particularly in the production of "cold rubber," are used in very small amounts ranging from 0.1 to 1.0%. The aqueous polymeric dispersions or latices obtained by any of these methods may be coagulated in the usual manner to obtain the solid polymer.

The amounts of the various ingredients required for satisfactory reaction rates using the redox catalyst of this invention are not critical and may vary somewhat. Generally, from 0.01 to 2.0% or more each of the oxidant, amine, and water-soluble sulfite based on the total monomeric material may be utilized. However, I have found that the oxidant/amine/$SO_3^=$ ratio has a more profound effect on reaction rates (or yield of polymer in a given time) than does the actual amount used. For example, for a given amount of amine the reaction rate steadily increases as the amount of oxidant is increased, until a point is reached where further increases in the amount of oxidant produces no further significant change in reaction rate. The relationship between the amount of oxidant and amine follows the formula:

(Opt. millimoles of oxidant) = $A + B$(millimoles of amine)

where $A = 0.2$ millimole and $B \cong \frac{2}{3}$.

The amount of sulfite present in the reaction medium does not appear to have a significant effect on the amount of oxidant required. However, for a given amount of amine and oxidant, the reaction rate slowly increases and then begins to fall off as the amount of sulfite compound is increased. Satisfactory reaction rates are obtained when the mole ratio of $SO_3^=$/amine is between 1/1 and 10/1 while higher reaction rates are obtained when the ratio is from 3/1 to 6/1. Under the described conditions the reaction rate is linear with respect to time until a conversion of 60 to 65% is reached.

The hydrogen ion concentration of the aqueous reaction medium has a profound effect on the reaction rate as is well understood in the art. With neutral or slightly acid media (pH 7.0 or below) the reaction rate is very slow. Under alkaline conditions the reaction is very fast, the rate increasing as the pH is increased. Generally, however, since corrosion difficulties are encountered with strongly alkaline aqueous media, it is more advantageous to carry out the polymerization at a pH ranging from 8.0 to 11.5 and it is preferred to carry out the polymerization at an initial pH of 9.0 to 11.0.

According to the present invention, the reaction is preferably carried out in an aqueous medium containing an efficient emulsifying agent. Ordinary fatty acid soaps such as potassium oleate seem to favor fast reaction in the presence of redox catalysts at low temperatures and are accordingly preferred when maximum reaction rates are desired. However, the polymers, particularly the synthetic rubbery polymers of the butadiene-1,3 hydrocarbons, are greatly superior when prepared in the presence of the rosin acid soaps. Reaction rates in the presence of certain rosin acid soaps are, however, somewhat lower as compared to reactions conducted in the presence of the better fatty acid soaps. Hydrogenated rosin acid soaps and disproportionated rosin acid soaps or other highly saturated soaps, however, have been found to approach the fatty acid soaps as regards reaction rate and also are preferred. Other emulsifying agents including the synthetic saponaceous materials such as the hymolal sulfates, alkaryl sulfonates and others may be utilized singly or in combination with one or more of the above or other emulsifying agents. It is particularly advantageous when carrying out the polymerization reaction at temperatures below 10° C. to utilize a mixture of a highly saturated hydrogenated or disproportionated rosin acid soap and a fatty acid soap such as potassium oleate for in this manner the highly desirable properties of rosin acid containing polymers are obtained at maximum rates. The amount of soap utilized in conjunction with the catalyst system of this invention may vary widely from as little as ½ to 1% to as high as 5 or 10% or more. Everything else being equal, the use of the higher amounts of soap seems to favor increased reaction rates.

When carrying out the polymerization in aqueous emulsion, particularly at temperatures of 30° C. or lower, the aqueous polymer dispersion becomes quite viscous as the reaction proceeds to higher conversions rendering agitation and efficient heat transfer very difficult. Consequently, as it is well known in the art, it is sometimes advantageous to increase the latex fluidity by adding to the reaction mixture an electrolyte such as any of the highly soluble sodium and potassium salts including potassium chloride, potassium sulfate, potassium and sodium pyrophosphates, potassium bisulfite, potassium sulfite and others and to utilize water/monomer ratios varying from as little as 0.5/1 to as high as 6/1 or more.

Although the reaction may be carried out in the presence of oxygen or air, the reaction is ordinarily faster in an evacuated vessel or under an inert atmosphere such as nitrogen. Though the temperature is not critical, efficient polymerization being obtained at temperatures as low at −30° C. to as high as 100° C. or more, it is ordinarily preferred to carry out the polymerization at temperatures from −20° C. to 30° C.

The invention will be more specifically described in the following examples, which are intended to be illustrative of the invention only and not as limitations on the scope thereof.

*Example 1*

The amine-bisulfite of tetraethylene pentamine, prepared by bubbling sulfur dioxide through a solution of 17.0 grams of tetraethylene pentamine in 25 grams of water at 10° C. until 29.7 grams of sulfur dioxide is absorbed, may be utilized in the preparation of a copolymer of butadiene-1,3 and styrene as follows:

| Material | Parts/Wt. |
|---|---|
| Butadiene-1,3 | 72.00 |
| Styrene | 28.00 |
| Emulsifier [1] | 4.50 |
| t-Dodecyl mercaptan | 0.25 |
| Diisopropylbenzene monohydroperoxide | 0.13 |
| KCl | 0.50 |
| Amine-$SO_2$ reaction product | 0.10 |
| KOH | 0.23 |
| Water | 180.00 |

[1] A partially hydrogenated rosin acid soap known as "Dresinat S-149."

The soap is dissolved in a portion of the water, the potassium hydroxide added thereto and the resultant solution cooled before use. The amine —SO₂ reaction product and the potassium chloride are then added directly to the cooled soap solution. The contents of the reaction vessel is then blanketed with nitrogen and the butadiene-1,3 added. A solution of the mercaptan in an aliquot portion of the styrene is added followed by injection of the diisopropyl monohydroperoxide in the remainder of the styrene. The reaction vessel is finally placed in a constant temperature bath maintained at 5° C. Reaction is noted to commence almost immediately and to progress smoothly to a conversion of 77% in 5 hours. By comparison, a similar polymerization conducted without sulfite ion reaches a conversion of only 50% in 8 hours at 5° C.

*Example 2*

Butadiene-1,3 styrene copolymers are prepared at 5° C. utilizing a reaction mixture having the following proportions:

| Material | Parts/Wt. |
|---|---|
| Butadiene-1,3 | 72.00 |
| Styrene | 28.00 |
| Emulsifier [1] | 4.50 |
| Diisopropylbenzene monohydroperoxide [2] | 0.13 |
| Tetraethylene pentamine | 0.10 |
| t-Dodecyl mercaptan | 0.25 |
| KHSO₃ | Variable |
| KOH (Added as a 0.3 N solution to desired pH) | Variable |
| Water | 180 |

[1] Sodium alkyl aryl sulfonate known commercially as Nacconol "NRSF."
[2] Known commercially as "Diox D."

In each case, the soap is dissolved in the water and added as a solution to the reaction vessel. The amine and sulfite are then added directly to the soap solution. The reaction vessel is then blanketed with nitrogen and a solution of the mercaptan in an aliquot portion of styrene added. Butadiene is charged, the vessel closed and the diisopropyl monohydroperoxide dissolved in the remainder of styrene is injected into the reactor. The reaction vessel and its contents are maintained at 5° C. The reaction is allowed to proceed for 7 hours when the reaction was terminated by the addition of 0.1% by weight based on the monomers of dinitrochlorobenzene. The percent of monomer-converted to polymer is determined by a total solids determination. Table I below illustrates the effect of variation in sulfite/amine ratio:

TABLE I

| Experiment No. | Parts KHSO₃ | Mole Ratio, SO₃/amine | Initial pH | Percent Conversion, 7 hrs. @ 5° C. |
|---|---|---|---|---|
| A | 0.064 | 1/1 | 7.0 | 4.6 |
| B | 0.254 | 4/1 | 7.0 | 11.8 |
| C | 0.318 | 5/1 | 7.0 | 13.1 |
| D | 0.064 | 1/1 | 10.0 | 23.1 |
| E | 0.127 | 2/1 | 10.0 | 28.3 |
| F | 0.191 | 3/1 | 10.0 | 39.3 |
| G | 0.254 | 4/1 | 10 | 52.5 |
| H | 0.254 | 4/1 | 10.5 | 66.3 |
| I | 0.318 | 5/1 | 10 | 46.0 |

In each case the reaction rate varied linearly with respect to time. The results clearly show that polymerization in neutral media is inferior to polymerization in a moderately alkaline system. The optimum SO₃⁼/amine ratio is also seen to be between 3/1 and 5/1. When the KHSO₃ is omitted, a conversion of only 50% is obtained in 8 hours at 5° C. Thus the reaction rate is increased from about 6%/hour without sulfite to 10%/hour with sulfite, an increase of over 60%.

*Example 3*

The effect of variation in the amount of oxidant at various levels of amine content at a constant sulfite content of 0.33 part/100 of monomers is shown by polymerizations conducted at 5° C. utilizing reaction mediums similar to Examples 1 and 2. Table II contains the data obtained:

TABLE II

| Parts of Amine per 100 parts Monomer | Parts Diox D | Percent Conversion in 5 hours |
|---|---|---|
| 0.05 | 0.025 | 22.8 |
| 0.05 | 0.05 | 33.5 |
| 0.05 | 0.10 | 47.3 |
| 0.05 | 0.13 | 48.1 |
| 0.05 | 0.20 | 47.0 |
| 0.10 | 0.05 | 32.2 |
| 0.10 | 0.10 | 58.6 |
| 0.10 | 0.13 | 64.8 |
| 0.10 | 0.25 | 62.8 |
| 0.20 | 0.05 | 26.9 |
| 0.20 | 0.10 | 43.3 |
| 0.20 | 0.13 | 54.2 |
| 0.20 | 0.25 | 72.1 |

It is clear that the optimum amount of oxidant at the above amine and sulfite levels lies in the range from 0.13 to 0.25 part per 100 parts of monomers.

*Example 4*

The diisopropylbenzene monhydroperoxide of the previous examples is but one of a class of oil-soluble aryl monohydroperoxides. When various amounts of others of this class are substituted for diisopropylbenzene monohydroperoxide in the recipe of Example 2 (except the rosin acid soap used in Example 1 is substituted for the alkyl aryl sulfonate emulsifier), the following results are obtained at 5° C.:

| Oxidant | Parts Oxidant | Percent Conversion, 6 hours at 5° C. |
|---|---|---|
| Diisopropylbenzene monohydroperoxide | 0.19 | 58.9 |
| Triisopropylbenzene monohydroperoxide | 0.24 | 64.1 |
| t-Butyl isopropylbenzene monohydroperoxide | 0.21 | 56.5 |
| Cyclohexylbenzene monohydroperoxide | 0.19 | 67.3 |
| Cumene hydroperoxide | 0.15 | 37.5 |

*Example 5*

Butadiene styrene copolymers are prepared at enhanced rates at 5° C. when other polyamines of the preferred class are utilized in combination with a substance ionizable to yield sulfite ion. For example, reaction mixtures are prepared having the following proportions:

| Material | Parts/Wt. |
|---|---|
| Butadiene-1,3 | 72.00 |
| Styrene | 18.00 |
| Emulsifier (Same as Ex. 1) | 4.50 |
| t-Dodecyl mercaptan | 0.25 |
| Diisopropylbenzene monohydroperoxide | 0.13 |
| Amine (variable in kind) | 0.10 |
| K₂SO₃ | 0.33 |
| Water | 180.00 |

The results are as follows:

| Amine | Percent Conversion, 5 hours at 5° C. |
|---|---|
| Ethylene diamine | 7.43 |
| Diethylene triamine | 15.93 |
| Triethylene tetramine | 30.11 |
| Tetraethylene pentamine | 63.25 |

When KCl is substituted for the K$_2$SO$_3$ of the previous polymerizations the results are as follows:

| Amine | Percent Conversion, 5 hours at 5° C. |
|---|---|
| Ethylene diamine | 4.18 |
| Diethylene triamine | 2.74 |
| Triethylene tetramine | 15.67 |
| Tetraethylene pentamine | 49.51 |

It is clear that with all the above amines the use of K$_2$SO$_3$ results in increased rates.

*Example 6*

The effect of using various emulsifiers is shown by the following polymerization reactions carried out at 5° C. utilizing medium having the following proportions:

| Material | Parts/Wt. |
|---|---|
| Butadiene-1,3 | 72.00 |
| Styrene | 28.00 |
| t-Dodecyl mercaptan | 0.25 |
| Diisopropylbenzene monohydroperoxide | 0.13 |
| Tetraethylene pentamine | 0.10 |
| KHSO$_3$ | 0.254 |
| KCl | 0.50 |
| Emulsifier (Variable in Kind) | 4.50 |
| KOH* | Variable |
| Water | 180 |

* Amount required to adjust pH to 10.5.

The results are as follows:

| Emulsifier | Percent Conversion, 8 hours at 5° C. |
|---|---|
| #1 | ¹ 64.6 |
| #2 | 42.0 |
| #3 | 55.0 |
| #4 | 34.0 |
| #5 | 38.0 |
| #6 | 20.4 |
| #7 | 40.0 |
| #8 | 44.0 |

1—A saturated potassium rosin acid soap.
2—A "tall-oil" soap.
3—A partially saturated potassium rosin acid soap.
4—A disproportionated potassium rosin acid soap.
5—A disproportionated sodium rosin acid soap.
6—A potassium fatty acid soap largely potassium oleate.
7—80/20 mixture of emulsifiers #5 and #6.
8—80/20 mixture of emulsifiers #4 and #6.

¹ Conversion in seven hours at 5° C.

It is clear that the more saturated rosin acid soaps give superior results and that a mixture of saturated rosin acid and fatty acid soaps are also highly useful.

*Example 7*

The redox catalyst of the above examples produces especially satisfactory results when utilized for the polymerization of mixtures comprising from 50 to 80% by weight of butadiene-1,3 and from 20 to 50% by weight of acrylonitrile. For example, a reaction mixture is prepared having the following proportions:

| Material | Parts/Wt. |
|---|---|
| Butadiene-1,3 | 67.00 |
| Acrylonitrile | 33.00 |
| Emulsifier ¹ | 4.60 |
| Tetraethylene pentamine | 0.15 |
| Diisopropylbenzene monohydroperoxide | 0.15 |
| Potassium sulfite | 0.25 |
| t-Dodecyl mercaptan | 0.30 |
| Methanol | 40.00 |
| Water | 160.00 |

¹ A potassium fatty acid soap largely potassium oleate.

The above mixture of materials is placed in a steel reaction vessel and maintained at −10° C. for 24 hours. The reaction in that time has progressed to 75% conversion. A monomeric mixture consisting of 67% by weight of butadiene-1,3, 17% by weight of acrylonitrile, and 16% by weight of styrene polymerizes in a reaction medium similar to that of this example to 75% conversion in less than 24 hours. Without sulfite ion the reactions require from 30 to 40 hours or more.

In addition monomeric mixtures containing, respectively, vinyl chloride and acrylonitrile, ethyl acrylate, ethyl acrylate and acrylic acid, vinyl chloride and vinylidene chloride, and vinyl chloride and ethyl acrylate are polymerized at a greater speed in the presence of a polyamine and a sulfite than in the absence of the sulfite.

While I have disclosed certain preferred manners of performing my invention, I do not thereby desire or intend to limit myself solely thereto, for the precise proportions of the materials utilized may be varied and equivalent chemical materials employed, if desired, without departing from the spirit and scope of the invention as defined in the appended claims.

I claim:
1. The process which comprises subjecting a monomeric material comprising a vinylidene compound to polymerization in an alkaline aqueous medium in the presence of catalytic amounts of a combination of substances comprising a peroxygen compound, a water-soluble alkylene polyamine in which there are at least two amino groups separated by at least two carbon atoms and containing at least one primary terminal amino group, and a substance ionizable to yield sulfite (SO$_3$=) ion.

2. The process which comprises subjecting a monomeric material comprising a butadiene-1,3 hydrocarbon to polymerization in alkaline aqueous emulsion in the presence of catalytic amounts of a combination of substances comprising a peroxygen compound, a water-soluble alkylene polyamine in which there are at least two amino groups separated by at least two carbon atoms and containing at least one primary terminal amino group, and a substance ionizable to yield sulfite (SO$_3$=) ion.

3. The method of claim 2 wherein there is substituted for the said alkylene polyamine and water-soluble sulfite compound a reaction product formed by reaction in aqueous solution between an alkylene polyamine of the class therein described and sulfur dioxide.

4. The method which comprises subjecting a monomeric material comprising a butadiene-1,3 hydrocarbon to polymerization in alkaline aqueous emulsion in the presence of a redox catalyst combination comprising an alkyl-substituted benzene monohydroperoxide, a polyethylene polyamine, and a water-soluble sulfite compound.

5. The method of claim 4 wherein the monomeric material polymerized is a mixture of butadiene-1,3 and a copolymerizable vinyl compound.

6. The method of claim 4 wherein the monomeric material polymerized is a mixture of butadiene-1,3 and styrene.

7. The method of claim 4 wherein the monomeric material polymerized is a mixture of butadiene-1,3 and acrylonitrile.

8. The method which comprises subjecting a monomeric material comprising butadiene-1,3 and styrene to polymerization in alkaline aqueous emulsion in the presence of a redox catalyst combination comprising diisopropylbenzene monohydroperoxide, tetraethylene pentamine, and potassium sulfite.

9. The method which comprises subjecting a monomeric comprising butadiene-1,3 and acrylonitrile to polymerization in alkaline aqueous emulsion in the presence of a redox catalyst combination comprising diisopropylbenzene monohydroperoxide, tetraethylene pentamine, and potassium sulfite.

WILLIAM D. STEWART.

REFERENCES CITED

The following references are of record in the file of this patent:

UNITED STATES PATENTS

| Number | Name | Date |
|---|---|---|
| 2,462,354 | Brubaker et al. | Feb. 22, 1949 |
| 2,543,636 | Loritsch | Feb. 27, 1951 |

OTHER REFERENCES

Whitby et al.: Rubber Age, vol. 65, No. 5, August 1949, p. 545.

Whitby et al.: Ind. and Eng. Chem., vol. 42, No. 3, March 1950, pp. 445–456.